(12) United States Patent
Rogues De Fursac et al.

(10) Patent No.: US 11,242,497 B2
(45) Date of Patent: *Feb. 8, 2022

(54) COMPOUND COMPRISING POLYAMINE, ACIDIC AND BORON FUNCTIONALITIES AND ITS USE AS A LUBRICANT ADDITIVE

(71) Applicant: TOTAL MARKETING SERVICES, Puteaux (FR)

(72) Inventors: Isabelle Rogues De Fursac, Oullins (FR); Valérie Doyen, Four (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/613,618

(22) PCT Filed: May 30, 2018

(86) PCT No.: PCT/EP2018/064176
§ 371 (c)(1),
(2) Date: Nov. 14, 2019

(87) PCT Pub. No.: WO2018/220007
PCT Pub. Date: Dec. 6, 2018

(65) Prior Publication Data
US 2020/0199478 A1   Jun. 25, 2020

(30) Foreign Application Priority Data

May 31, 2017 (EP) .................................... 17305631

(51) Int. Cl.
| | | |
|---|---|---|
| *C07F 5/04* | (2006.01) | |
| *C10M 159/02* | (2006.01) | |
| *C10M 169/04* | (2006.01) | |
| *C10M 159/12* | (2006.01) | |
| *C10N 40/25* | (2006.01) | |

(52) U.S. Cl.
CPC ............. *C10M 159/12* (2013.01); *C07F 5/04* (2013.01); *C10M 169/04* (2013.01); *C10M 2227/061* (2013.01); *C10M 2290/02* (2013.01); *C10N 2040/252* (2020.05)

(58) Field of Classification Search
CPC .............. C10M 159/12; C10M 169/04; C10M 2227/061; C07F 5/04
See application file for complete search history.

(56) References Cited

U.S. PATENT DOCUMENTS

| | | |
|---|---|---|
| 2,497,521 A | 2/1950 | Trautman |
| 2005/0172543 A1 | 8/2005 | Muir |
| 2006/0276350 A1 | 12/2006 | Habeeb et al. |
| 2015/0299606 A1 * | 10/2015 | Muir ........................ C10L 10/18 508/158 |
| 2016/0281014 A1 | 9/2016 | Muir et al. |
| 2018/0223218 A1 | 8/2018 | Doyen et al. |
| 2020/0071633 A1 * | 3/2020 | Rogues De Fursac ..................... C10M 159/12 |

FOREIGN PATENT DOCUMENTS

| | | | |
|---|---|---|---|
| EP | 1 783 134 A2 | 5/2007 | |
| EP | 3 072 951 A1 | 9/2016 | |
| EP | 3072951 A1 * | 9/2016 | ............... C10L 1/30 |
| JP | 2005-290150 A | 10/2005 | |

OTHER PUBLICATIONS

Aug. 21, 2018 International Search Report issued in International Patent Application No. PCT/EP2018/064176.
Dec. 3, 2019 International Preliminary Report on Patentability issued in International Patent Application No. PCT/EP2018/064176.

* cited by examiner

*Primary Examiner* — Ellen M McAvoy
*Assistant Examiner* — Ming Cheung Po
(74) *Attorney, Agent, or Firm* — Oliff PLC

(57) ABSTRACT

A product resulting from the reaction of at least: a hydroxybenzoic acid, optionally substituted by a hydrocarbyl group, a boron compound, an amine component selected from compounds including two or three amine functions, wherein at least one amine function is substituted by at least one hydrocarbyl group. A lubricant composition including this product. Use of this product as a lubricant for two-stroke marine engines and four-stroke marine engines, more preferably two-stroke marine engines.

20 Claims, No Drawings

COMPOUND COMPRISING POLY AMINE, ACIDIC AND BORON FUNCTIONALITIES AND ITS USE AS A LUBRICANT ADDITIVE

The invention is directed to the reaction product of an acidic organic compound, a boron compound and an amine component comprising two or three amine functions. It is also directed to a lubricant composition comprising this reaction product, a method for its production and its uses.

STATE OF THE ART

One of the primary functions of lubricants is to decrease friction. Frequently, however, lubricating oils need additional properties to be used effectively. For example, lubricants used in large diesel engines, such as, for example, marine diesel engines, are often subjected to operating conditions requiring special considerations.

The marine oils used in low-speed two-stroke crosshead engines are of two types. On the one hand, cylinder oils ensuring the lubrication of the cylinder-piston assembly and, on the other hand, system oils ensuring the lubrication of all the moving parts apart from the cylinder-piston assembly. Within the cylinder-piston assembly, the combustion residues containing acid gases are in contact with the lubricating oil.

The acid gases are formed from the combustion of the fuel oils; these are in particular sulphur oxides ($SO_2$, $SO_3$), which are then hydrolyzed on contact with the moisture present in the combustion gases and/or in the oil. This hydrolysis generates sulphurous ($HSO_3$) or sulphuric ($H_2SO_4$) acid.

To protect the surface of piston liners and avoid excessive corrosive wear, these acids must be neutralized, which is generally done by reaction with the basic sites included in the lubricant.

An oil's neutralization capacity is measured by its BN or Base Number, characterized by its basicity. It is measured according to standard ASTM D-2896 and is expressed as an equivalent in milligrams of potash per gram of oil (also called "mg of KOH/g" or "BN point"). The BN is a standard criterion making it possible to adjust the basicity of the cylinder oils to the sulphur content of the fuel oil used, in order to be able to neutralize all of the sulphur contained in the fuel, and capable of being converted to sulphuric acid by combustion and hydrolysis.

Thus, the higher the sulphur content of a fuel oil, the higher the BN of a marine oil needs to be. This is why marine oils with a BN varying from 5 to 140 mg KOH/g are found on the market. This basicity is provided by detergents that are neutral and/or overbased by insoluble metallic salts, in particular metallic carbonates. The detergents, mainly of anionic type, are for example metallic soaps of salicylate, phenate, sulphonate, carboxylate type etc. which form micelles where the particles of insoluble metallic salts are maintained in suspension. The usual neutral detergents intrinsically have a BN typically less than 150 mg KOH per gram of detergent and the usual overbased detergents intrinsically have a BN in a standard fashion comprised between 150 and 700 mg KOH per gram of detergent. Their percentage by mass in the lubricant is fixed as a function of the desired BN level.

Environmental concerns have led, in certain areas and in particular coastal areas, to requirements relating to the limitation of the level of sulphur in the fuel oils used on ships. Thus, the regulation MARPOL Annex 6 (Regulations for the Prevention of Air Pollution from Ships) issued by the IMO (International Maritime Organization) entered into force in May 2005. It sets a global cap of 4.5% w/w on the sulphur content of heavy fuel oils as well as creating sulphur oxide emission control areas, called SECAs (Sulphur Emission Control Areas). Ships entering these areas must use fuel oils with a maximum sulphur content of 1.5% w/w or any other alternative treatment intended to limit the SOx emissions in order to comply with the specified values. The notation w/w denotes the percentage by weight of a compound relative to the total weight of fuel oil or lubricating composition in which it is included.

More recently the MEPC (Marine Environment Protection Committee) met in April 2008 and approved proposed amendments to the regulation MARPOL Annex 6. These proposals are summarized in the table below. They present a scenario in which the restrictions on the maximum sulphur content become more severe with a worldwide maximum content reduced from 4.5% w/w to 3.5% w/w as from 2012. The SECAs (Sulphur Emission Control Areas) will become ECAs (Emission Control Areas) with an additional reduction in the maximum permissible sulphur content from 1.5% w/w to 1.0% w/w as from 2010 and the addition of new limits relating to contents of NOx and particles.

| | Amendments to MARPOL Annex 6 (MEPC Meeting No. 57 - April 2008) | |
|---|---|---|
| | General limit | Limit for the ECAs |
| Maximum sulphur | 3.5% w/w on fuel content Jan. 1, 2012 0.5% w/w on fuel content Jan. 1, 2020 | 1% w/w on fuel content Jul. 1, 2010 0.1% w/w on fuel content Jan. 1, 2015 |

Ships sailing trans-continental routes already use different heavy fuel oil depending on local environmental constraints, allowing them to optimize their operating costs. This situation will continue irrespective of the final level of the maximum permissible sulphur content of fuel oils. Thus the majority of container ships currently under construction provide for the utilization of bunker tanks, for a "high sea" fuel oil with a high sulphur content on the one hand and for a 'SECA' fuel oil with a sulphur content less than or equal to 0.1% w/w on the other hand. Switching between these two categories of fuel oil can require adaptation of the engine's operating conditions, in particular the utilization of appropriate cylinder lubricants.

Currently, in the presence of fuel oil with a high sulphur content (3.5% w/w and less), marine lubricants having a BN of the order of 70 or less are used. In the presence of a fuel oil with a low sulphur content (0.1% w/w), marine lubricants having a BN of the order of 40 or less are used. In these two cases, a sufficient neutralizing capacity is achieved as the necessary concentration in basic sites provided by the neutral and/or the overbased detergents of the marine lubricant is reached, but it is necessary to change lubricant at each change of type of fuel oil.

Moreover, each of these lubricants has limits of use resulting from the following observations: the use of a high BN cylinder lubricant in the presence of a fuel oil with a low sulphur content (0.1 w/w) and at a fixed lubrication level, creates a significant excess of basic sites (high BN) and a risk of destabilization of the micelles of unused overbased detergent, which contain insoluble metallic salts. This destabilization results in the formation of deposits of insoluble metallic salts (for example calcium carbonate), mainly on the piston crown, and can eventually lead to a risk of excessive wear of the liner-polishing type. Further, the use of a low BN cylinder lubricant is not sufficient in term of total neutralization capacity in the presence of a fuel oil with a high sulphur content and thus can cause an important risk of corrosion.

Therefore, the optimization of the cylinder lubrication of a low-speed two-stroke engine then requires the selection of the lubricant with the BN adapted to the fuel oil and to the operating conditions of the engine. This optimization reduces the flexibility of operation of the engine and requires a significant degree of technical expertise on the part of the crew in defining the conditions under which the switching from one type of lubricant to the other must be carried out.

Actually, the operating conditions of marine engine and notably of two-stroke marine engine, are increasingly stringent standards. Accordingly, the lubricant being directly in contact with the engine, and notably with the hot section of the engine as for example the segment-piston-pump assembly, shall ensure a resistance to an elevated temperature and thus, reduce or prevent the formation of deposits in the hot section of the engine but also shall ensure a good neutralization towards the sulfuric acid generated during the combustion of fuel.

There is a need for a marine detergent, which is able to be used in presence of high-sulphur fuels and also low-sulphur fuels and having a good neutralization capacity of sulfuric acid while maintaining a good thermal resistance and thus a lower risk of deposits formation in the hot section of the engine.

There is also a need for marine lubricants having a BN, notably having a BN inferior or equal to BN 70, able to be used in presence of high-sulphur fuels and also low-sulphur fuels and having a good neutralization of sulfuric acid while maintaining a good thermal resistance and thus a lower risk of deposits formation in the hot section of the engine.

It would also be desirable to have a lubricant for marine engines, including for a two-stroke marine engine, displaying no or few risk of viscosity increase over time, and particularly during its use.

An object of the present invention is to provide a lubricant additive overcoming all or part of the aforementioned drawbacks. Another object of the present invention is to provide a lubricant additive whose formulation within lubricant compositions is easy to implement.

Another object of the present invention is to provide a lubricant composition overcoming all or part of the aforementioned drawbacks.

Another object of the present invention is to provide a lubricant composition whose formulation is easy to implement.

Another object of the present invention is to provide a method for lubricating a marine engine, and especially for lubricating a two-stroke marine engine used with both low-sulphur fuel and high-sulphur fuel.

Another object of the present invention is to provide a method for lubricating a marine engine, and especially a for a two-stroke marine engine used with very low-sulphur fuel.

An other object of the present invention is to provide a method for reducing the formation of deposits in the hot section of a marine engine, notably of a two-stroke marine engine.

Document US2015/0299606 discloses a metal-free detergent and antioxidant additive that can be used in a lubricating oil comprising the reaction product of an acidic organic compound, a boron compound, a polyamine such as polyethylene imine, and optionally an alkoxylated amine and/or an alkoxylated amide. This document does not disclose the reaction product of an acidic organic compound, a boron compound, a polyamine wherein at least one amine is substituted by a hydrocarbyl group.

US 2005/172543 discloses a composition comprising the reaction product of an acidic organic compound, a boron compound and a basic organic compound and its use as a detergent additive for lubricants and hydrocarbon fuels.

EP 3 072 951 discloses a detergent composition for use in lubricating oil compositions, said detergent comprising:
an overbased calcium sulfonate, and
a metal free low ash detergent comprising the reaction product of:
an acidic organic compound,
a boron compound, and
an amine component comprising one or more amines.

None of these documents discloses the reaction product of an acidic organic compound, a boron compound and a polyamine as defined here-under.

US2016/0281014 discloses a lubricating oil detergent composition comprising an overbased calcium sulfonate and a low ash detergent, which is metal free and comprises the reaction product of an acidic organic compound such as an alkylated salicylic acid, a boron compound and an amine component.

EP 1 783 134 discloses a process for the preparation of middle to high TBN detergent-dispersant additives for lubricating oil applications for internal combustion engines. These additives consist in overbased alkali metal alkyl hydroxybenzoate. Such additives have lower solubility in lubricating oils and for this reason are mainly used in four-stroke Slow-speed engines.

Additives combining an alkylated salicylic acid, a boron compound and an amine component provide satisfactory resistance to corrosion and wear. However, for some of those compounds, increasing the amount of additive in the lubricating oil increases oil viscosity while neutralization occurs, thus degrading the lubricating efficacy. Other compounds have proven satisfactory with regards to the control of oil viscosity increase but are less satisfactory with regards to detergency performance. Other compounds have also proven satisfactory with regards to the performance of detergency but are less satisfactory with regards to oil viscosity increase while neutralisation occurs.

Thus, there is a need for a lubricant additive that will simultaneously provide effective corrosion and wear resistance, that will provide satisfactory rheology while in use, in order to enhance lubricating efficacy, and that will provide high detergency performance, thus avoiding the formation of deposits.

The reaction products of the present invention advantageously provide improved detergency and oxidation stability. Furthermore, the reaction products provide excellent detergency and cleanliness to a lubricating oil and do not degrade the oil rheology under use. They provide excellent corrosion and wear resistance.

SUMMARY OF THE INVENTION

The invention concerns the reaction product of at least:
A hydroxybenzoic acid, optionally substituted by a hydrocarbyl group,
a boron compound,
an amine component selected from compounds comprising two or three amine functions, wherein at least one amine function is substituted by at least one hydrocarbyl group.

The invention is also directed to a lubricant composition comprising such a reaction product and a base oil.

The invention is also directed to the use of the product or the lubricant composition, for lubricating two-stroke marine engines and four-stroke marine engines, more preferably two-stroke marine engine.

According to a favourite embodiment, the hydrocarbyl-substituted hydroxybenzoic acid is selected from mono-alk(en)yl substituted salicylic acids, di-alk(en)yl substituted salicylic acids, acid functionalized calixarenes, notably salicylic acid calixarenes, and mixtures thereof.

According to a more favourite embodiment, the hydroxybenzoic acid compounds, optionally substituted by a hydrocarbyl group, responds to formula (I):

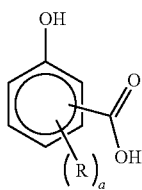

(I)

Wherein:
R represents a hydrocarbyl with 1 to 50 carbon atoms, and R can comprise one or more heteroatoms,
a is an integer, a represents 0, 1 or 2.

According to a favourite variant, in formula (I), a represents 1 or 2.

According to another variant, in formula (I), a represents 0.

According to an even more favourite embodiment, the hydroxybenzoic acid compounds, optionally substituted by a hydrocarbyl group, responds to formula (IA):

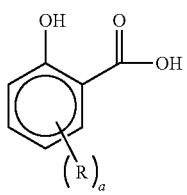

(IA)

According to a favourite variant, in formula (IA), a represents 1 or 2.

According to another variant, in formula (IA), a represents 0.

According to a favourite embodiment, the boron compound is selected from: boric acid, boric acid complexes, boric oxide, a trialkyl borate in which the alkyl groups comprise independently from 1 to 4 carbon atoms, a $C_1$-$C_{12}$ alkyl boronic acid, a $C_1$-$C_{12}$ dialkyl boric acid, a $C_6$-$C_{12}$ aryl boric acid, a $C_6$-$C_{12}$ diaryl boric acid, a $C_7$-$C_{12}$ aralkyl boric acid, a $C_7$-$C_{12}$ diaralkyl boric acid, or products deriving from these by substitution of an alkyl group by one or more alkoxy unit, advantageously, the boron compound is boric acid.

According to a favourite embodiment, the amine component is selected from compounds comprising two or three amine functions and at least one amine function is substituted by at least one $C_1$-$C_{40}$ alkyl or alkenyl group.

According to a favourite variant, the amine component is selected from di-amines of formula (IV):

$$R_1NX\text{—}Ra\text{—}NZ_1Z_2 \qquad (IV)$$

wherein
X represents a group selected from: a hydrogen, an alkyl group or an alkenyl group $R_2$,
$Z_1$ and $Z_2$ are independently selected from: a hydrogen, an alkyl group or an alkenyl group $R_3$,
$R_1$, $R_2$ and $R_3$ are independently selected from alkyl and alkenyl groups comprising from 1 to 40 atoms of carbon,
Ra is selected from alkyl and alkenyl groups comprising from 1 to 20 atoms of carbon,
when $Z_1$ and $Z_2$ both represent an alkyl group or an alkenyl group $R_3$, they can be different.

According to another favourite variant, the amine component is selected from tri-amines of formula (V):

$$R_1NX\text{—}Ra\text{—}NY\text{—}Rb\text{—}NZ_1Z_2 \qquad (V)$$

wherein
X represents a group selected from: a hydrogen, an alkyl group or an alkenyl group $R_2$,
Y represents a group selected from: a hydrogen, an alkyl group or an alkenyl group $R_4$,
$Z_1$ and $Z_2$ are independently selected from: a hydrogen, an alkyl group or an alkenyl group $R_3$,
$R_1$, $R_2$, $R_3$ and $R_4$ are independently selected from alkyl and alkenyl groups comprising from 1 to 40 atoms of carbon,
Ra and Rb are independently selected from alkyl and alkenyl groups comprising from 1 to 20 atoms of carbon,
when $Z_1$ and $Z_2$ both represent an alkyl group or an alkenyl group $R_3$, they can be different.

According to a favourite embodiment, $R_1$, $R_2$, $R_3$ and $R_4$ are, independently, selected from linear alkyl groups and alkenyl groups with 14 to 22 carbon atoms, preferably with 14 to 18 carbon atoms, more preferably with 16 to 18 carbon atoms.

According to a more favourite embodiment, $R_1$, $R_2$, $R_3$ and $R_4$ are derived from animal and vegetal oils and fats, such as tallow oil, coconut oil and palm oil, preferably from tallow oil.

DETAILED DESCRIPTION

The term "consists essentially of" followed by one or more characteristics, means that may be included in the process or the material of the invention, besides explicitly listed components or steps, components or steps that do not materially affect the properties and characteristics of the invention.

The expression "comprised between X and Y" includes boundaries, unless explicitly stated otherwise. This expression means that the target range includes the X and Y values, and all values from X to Y.

"Alkyl" means a saturated hydrocarbon chain, that can be linear, branched or cyclic.

"Alkenyl" means a hydrocarbon chain, that can be linear, branched or cyclic and comprises at least one unsaturation, preferably a carbon-carbon double bond.

"Aryl" means an aromatic hydrocarbon functional group. This functional group can be monocyclic or polycyclic. As examples of an aryl group one can mention: phenyl, naphtalen, anthracen, phenanthren and tetracen.

"Aralkyl" means an aromatic hydrocarbon functional group, preferably monocyclic, that comprises an alkyl chain substituent.

"Hydrocarbyl" means a compound or fragment of a compound selected from: an alkyl, an alkenyl, an aryl, an aralkyl. Where indicated, some hydrocarbyl groups include heteroatoms.

The Hydroxybenzoic Acid

The hydroxybenzoic acid compounds, optionally substituted by a hydrocarbyl group, are molecules that comprise at least one benzoic acid fragment, and the aromatic ring bears at least one hydroxyl function and possibly one alkyl, alkenyl, aryl or aralkyl substituent. When present, the hydrocarbyl substituent and the hydroxy function can be in ortho, meta or para position with regards to the acidic function and with regards to each other. The hydrocarbyl substituent can comprise from 1 to 50 carbon atoms.

The hydroxybenzoic acid compounds include salicylic acid (hydroxy-2-benzoic acid), hydroxy-3-benzoic acid, hydroxy-4-benzoic acid, preferably salicylic acid.

The hydrocarbyl-substituted hydroxybenzoic acid compounds include, non limitatively, mono-alk(en)yl substituted salicylic acids, di-alk(en)yl substituted salicylic acids, acid functionalized calixarenes, notably salicylic acid calixarenes, and mixtures thereof.

A calixarene is a macrocycle consisting of several phenolic units which can be parasubstituted and connected by a methylene bridge. This cyclic oligomer comprises a sequence of 4 to 16 phenols forming a ring and connected by methylene bridges —(CH$_2$)— or similar bridges.

The hydroxybenzoic acid compounds, optionally substituted by a hydrocarbyl group, can, according to a first variant, respond to formula (I) below:

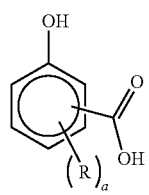

(I)

Wherein:

R represents a hydrocarbyl with 1 to 50 carbon atoms, and R can comprise one or more heteroatoms, a is an integer, a represents 0, 1 or 2.

According to a first variant a=0.

According to another variant a=1 or 2.

When a=2, the two hydrocarbyl groups can be identical or different.

Advantageously a=1.

Hydrocarbyl groups in formula (I) means alkyl, alkenyl, aryl and aralkyl groups, possibly comprising one or more heteroatoms.

Hydrocarbyl groups in formula (I) may be linear, branched or cyclic.

Heteroatoms in R can be selected from O, N, S. For example, they can be present as one or more of: an —OH, —NH$_2$, or —SH substituent, or an —O—, —NH—, —N═ or —S— bridge.

Preferably, R does not comprise heteroatoms.

Preferably, R is selected from alkyl and alkenyl groups.

Advantageously, R represents an alkyl or an alkenyl with 1 to 50 carbon atoms.

Preferably, R is selected from linear and branched alkyl and alkenyl groups.

Even more advantageously, R represents a linear alkyl with 1 to 50 carbon atoms.

Preferably R comprises from 12 to 40 carbon atoms, even more preferably R comprises from 18 to 30 carbon atoms.

Salicylic acid is commercially available.

Hydrocarbyl substituted hydroxybenzoic acids can be prepared according to the method disclosed in EP1 783 134.

Advantageously, in formula (I), —OH and —COOH are in the ortho position on the phenyl ring, and the molecule of formula (I) is salicylic acid or a salicylic acid derivative of formula (IA):

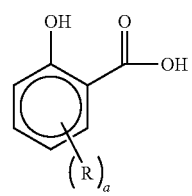

(IA)

Wherein R and a have the same definition as in formula (I) and the favourite variants of these parameters are the same as in formula (I).

Hydrocarbyl substituted salicylic acids are commercially available from Chemtura under trade name RD-225 and S-220 or from Oronite under trade name OLOA 16300, OLOA 16301 and OLOA 16305 or from Infineum under trade name M7101, M7102, M7121 and M7125.

According to a second variant, the hydroxybenzoic acid compounds, optionally substituted by a hydrocarbyl group, can be selected from calixarene structures. Calixarene structures according to the invention include cyclic structures comprising m units of a hydrocarbyl-substituted hydroxybenzoic acid of formula (II) and n units of a phenol of formula (III) which are joined together to form a ring:

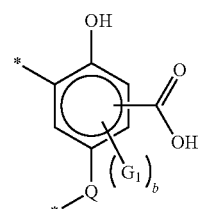

(II)

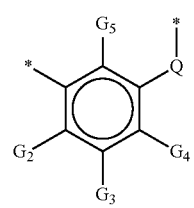

(III)

wherein

G$_1$ represents a hydrocarbyl with 1 to 50 carbon atoms, and G$_1$ can comprise one or more heteroatoms, b is an integer, b represents 0, 1 or 2, Q represents independently a divalent bridging group, G$_2$, G$_3$, G$_4$ and G$_5$, are selected from: OH, H, or a hydrocarbyl group with 1 to 50 carbon atoms that can comprise one or more heteroatoms, with the condition that one or two of G$_2$, G$_3$, G$_4$ and G$_5$ is OH, m and n are integers that verify:

m is from 1 to 8, n is at least 3, m+n is from 4 to 20.

According to a variant, b represents 0.

According to another variant, b represents 1 or 2.

Advantageously, m+n is from 5 to 12.

When b=2, the two hydrocarbyl groups $G_1$ can be identical or different.

Hydrocarbyl groups in formula (II) and (III) means alkyl, alkenyl, aryl and aralkyl groups, possibly comprising one or more heteroatoms.

Hydrocarbyl groups in formula (II) and (III) may be linear, branched or cyclic.

Heteroatoms in $G_1$, $G_2$, $G_3$, $G_4$ and $G_5$ can be selected from O, N, S. For example, they can be present as one or more of: an —OH, —$NH_2$, or —SH substituent, or an —O—, —NH—, —N═ or —S— bridge.

Preferably, $G_1$ is selected from alkyl and alkenyl groups.

Advantageously, $G_1$ represents an alkyl or an alkenyl with 1 to 50 carbon atoms. Even more advantageously, $G_1$ represents a linear alkyl with 1 to 50 carbon atoms.

Preferably $G_1$ comprises from 12 to 40 carbon atoms, even more preferably $G_1$ comprises from 18 to 30 carbon atoms.

Preferably, the units (II) are selected from those that respond to formula (IIA) here-under:

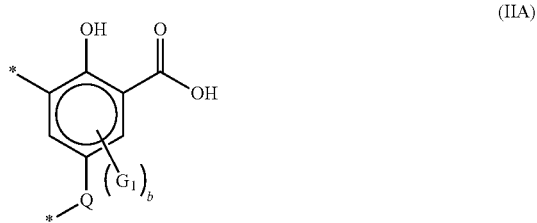

(IIA)

wherein $G_1$, Q and b have the same definition as in formula (II) and the favourite variants of these parameters are the same as in formula (II).

Advantageously in formula (III), $G_5$ is hydroxyl.

Advantageously, $G_2$, $G_3$, $G_4$ independently represent H or an alkyl or an alkenyl with 1 to 50 carbon atoms. Even more advantageously, $G_2$, $G_3$, $G_4$ independently represent H or a linear alkyl with 1 to 40 carbon atoms.

Preferably $G_2$, $G_3$, $G_4$ are independently selected from H and linear alkyl groups comprising from 1 to 30 carbon atoms, even more preferably they are selected from H and linear alkyl groups comprising from 4 to 25 carbon atoms.

When more than one unit (II) is present, the units (II) can be identical or different.

The units (III) can be identical or different in a calixarene molecule.

When more than one unit (II) is present in the ring (m>1), the units (II) and (III) are distributed randomly.

Each Q may independently be selected from —S— and groups represented by the formula —$(CHG_6)_c$- in which $G_6$ is selected from: hydrogen or hydrocarbyl group with 1 to 10 carbon atoms and c is an integer from 1 to 4. Advantageously, each $G_6$ is H or a hydrocarbyl group that contains 1 to 6 carbon atoms, and even more preferably each $G_6$ is H.

Preferably, at least 50% of the bridging groups Q are independently represented by the formula —$(CHG_6)_c$-. Preferably, c is an integer from 1 to 4, wherein each $G_6$ is H or a hydrocarbyl group that contains 1 to 6 carbon atoms, and even more preferably each $G_6$ is H.

Advantageously, all Q groups are selected from —$(CHG_6)_c$- and c is 1, wherein each $G_6$ is H or a hydrocarbyl group that contains 1 to 6 carbon atoms, and even more preferably each $G_6$ is H.

The Boron Compound

The boron compound is selected from boric acid, hydrocarbyl boronic acids, boric esters and hydrocarbyl boronic esters, boric oxide, boric acid complexes.

The boron compound can, for example, be selected from: boric acid, boric oxide, boric acid complexes, a trialkyl borate in which the alkyl groups comprise independently from 1 to 4 carbon atoms, a $C_1$-$C_{12}$ alkyl boronic acid, a $C_1$-$C_{12}$ dialkyl boric acid, a $C_6$-$C_{12}$ aryl boric acid, a $C_6$-$C_{12}$ diaryl boric acid, a $C_7$-$C_{12}$ aralkyl boric acid, a $C_7$-$C_{12}$ diaralkyl boric acid, or products deriving from these by substitution of an alkyl group by one or more alkoxy unit.

Alkyl groups and alkoxy groups can be linear, branched or cyclic.

Boric acid complexes are complexes with a molecule comprising one or more alcohol functionality.

Advantageously, the boron compound is boric acid.

The Amine Component

The amine component is selected from compounds comprising two or three amine functions (diamines and triamines) and at least one amine function is substituted by at least one hydrocarbyl group.

Preferably, the amine component is selected from compounds comprising two or three amine functions (diamines and triamines) and at least one amine function is substituted by at least one $C_1$-$C_{40}$ alkyl or alkenyl group.

According to a first variant, the amine component is selected from diamines. According to this variant, the amine component is advantageously selected from mono-hydrocarbyl and di-hydrocarbyl amino hydrocarbyl amines (IV):

(IV)

wherein

X represents a group selected from: a hydrogen, an alkyl group or an alkenyl group $R_2$, $Z_1$ and $Z_2$ are independently selected from: a hydrogen, an alkyl group or an alkenyl group $R_3$, $R_1$, $R_2$ and $R_3$ are independently selected from alkyl and alkenyl groups comprising from 1 to 40 atoms of carbon, Ra is selected from alkyl and alkenyl groups comprising from 1 to 20 atoms of carbon, when $Z_1$ and $Z_2$ both represent an alkyl group or an alkenyl group $R_3$, they can be different.

According to a second variant, the amine component is selected from triamines. According to this variant, the amine component is advantageously selected from mono-hydrocarbyl and di-hydrocarbyl amino hydrocarbyl amino hydrocarbyl amines (V):

(V)

wherein

X represents a group selected from: a hydrogen, an alkyl group or an alkenyl group $R_2$, Y represents a group selected from: a hydrogen, an alkyl group or an alkenyl group $R_4$, $Z_1$ and $Z_2$ are independently selected from: a hydrogen, an alkyl group or an alkenyl group $R_3$, $R_1$, $R_2$, $R_3$ and $R_4$ are independently selected from alkyl and alkenyl groups comprising from 1 to 40 atoms of carbon, Ra and Rb are independently selected from alkyl and alkenyl groups comprising from 1 to 20 atoms of carbon, when $Z_1$ and $Z_2$ both represent an alkyl group or an alkenyl group $R_3$, they can be different.

The explanation and favourite embodiments detailed here-under are relevant to both formula (IV) and formula (V).

"hydrocarbyl groups" in formula (IV) and (V) preferably means alkyl groups and alkenyl groups, that may be linear, branched or cyclic.

$R_1$, $R_2$, $R_3$ and $R_4$ are preferably selected from linear and branched alkyl groups and alkenyl groups. Even more preferably $R_1$, $R_2$, $R_3$ and $R_4$ are selected from linear alkyl groups and alkenyl groups.

$R_1$, $R_2$, $R_3$ and $R_4$ are preferably selected from alkyl groups and alkenyl groups comprising from 4 to 30 atoms of carbon, even more preferably from 8 to 22 carbon atoms.

According to a favourite variant, $R_1$, $R_2$, $R_3$ and $R_4$ are, independently, selected from linear alkyl groups and alkenyl groups with 14 to 22 carbon atoms, preferably with 14 to 18 carbon atoms, more preferably with 16 to 18 carbon atoms.

Although the groups $R_1$, $R_2$, $R_3$ and $R_4$ can be different, they are, in one embodiment, the same, since such materials are more economically produced. Irrespective of whether they are the same or not, $R_1$, $R_2$, $R_3$ and $R_4$ are, independently, preferably derived from chemical feedstock or from a natural source, such as from natural oils and fats. Particularly if a natural source is used, it means that each of $R_1$, $R_2$, $R_3$ and $R_4$ may be a mixture of alkyl and alkenyl radicals with varied chain lengths. Suitably $R_1$, $R_2$, $R_3$ and $R_4$ are derived from animal and vegetal oils and fats, such as from tallow oil, colza oil, sunflower oil, soya oil, flax oil, olive oil, palm oil, castor oil, wood oil, corn oil, squash oil, grapeseed oil, jojoba oil, sesame oil, walnut oil, hazelnut oil, almond oil, shea oil, macadamia oil, cotton oil, alfalfa oil, rye oil, safflower oil, peanut oil, coconut oil and copra oil, and mixtures thereof Preferably $R_1$, $R_2$, $R_3$ and $R_4$ are derived from tallow oil, coconut oil and palm oil. Preferably the $R_1$, $R_2$, $R_3$ and $R_4$ groups represent an aliphatic group obtained from tallow oil, and the corresponding mixture of fatty-alkyl(ene) polyamines are formed.

$R_1$, $R_2$, $R_3$ and $R_4$ are derived from animal and vegetal oils and fats means that $R_1$, $R_2$, $R_3$ and $R_4$ correspond to the mixture of aliphatic chains obtained by reduction of the fatty acids obtained from animal and vegetal oils and fats.

According to some variant, it may be beneficial to use hydrogenated groups $R_1$, $R_2$, $R_3$ and $R_4$. However, for certain feedstocks, even after hydrogenization, an appreciable amount of unsaturated bonds may remain. Alternatively, the $R_1$, $R_2$, $R_3$ and $R_4$ groups of the raw material are unsaturated. Also, compounds of formula (IV) and (V) wherein one of $R_1$, $R_2$, $R_3$ and $R_4$ is fully saturated and one is unsaturated are amine products that can be used according to the invention.

Ra and Rb are preferably selected from linear alkyl and alkenyl groups. Advantageously, Ra and Rb are preferably selected from alkyl groups, even more preferably from linear alkyl groups. Even more preferably, Ra and Rb are selected from linear alkyl groups comprising 2 to 4 atoms of carbon. Even more advantageously, Ra and Rb are selected from:
—$CH_2$—$CH_2$—, —$CH(CH_3)$—$CH_2$— and —$CH_2$—$CH_2$—$CH_2$—.

According to a favourite variant, Ra and Rb are selected from:
—$CH_2$—$CH_2$—, and —$CH_2$—$CH_2$—$CH_2$—.

According to a favourite embodiment of formula (IV) variant, the amine component is selected from compounds responding to formula (IVA):

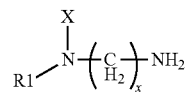

(IVA)

With:
$R_1$, X have the same definition and favourite embodiments as in formula (IV) and
x=2, 3, 4.

According to a favourite embodiment of formula (V) variant, the amine component is selected from compounds responding to formula (VB):

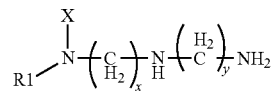

(VB)

With:
$R_1$, X have the same definition and favourite embodiments as in formula (V) and
x=2, 3, 4,
y=2, 3, 4.

Reaction Product

The reaction of the hydroxybenzoic acid, optionally substituted by a hydrocarbyl, the boron compound, and the amine component can be effected in any suitable manner.

For example, the reaction can be conducted by first combining hydroxybenzoic acid (optionally hydrocarbyl substituted) and the boron compound in the desired ratio and in the presence of a suitable solvent.

Suitable solvents are for example naphtha and polar solvents such as water and an alcohol, like for example: methanol, ethanol, propanol, butanol.

After a sufficient time, the boron compound dissolves. Then, the amine component is added slowly to the mixture to effect neutralization and formation of the desired reaction product.

The reaction can advantageously be conducted by maintaining the reaction medium at a temperature of from about 20° C. to about 100° C., for example from about 50° C. to about 75° C., generally for a time period ranging from about 0.5 to 5 hours, more preferably from 1 to 4 hours.

After the reaction is completed, the solvent may be evaporated from the reaction medium, preferably, it is evaporated by distillation under vacuum. Alternately, the solvent may remain in mixture with the reaction products which are used as such.

A diluting oil can be added as needed to control viscosity, particularly during removal of solvents by distillation.

The product resulting from this reaction will contain a complex mixture of compounds. The reaction product mixture need not be separated to isolate one or more specific components. Accordingly, the reaction product mixture can be employed as is in the lubrication oil composition of the present invention.

The reaction can be achieved with other reactants in addition to the hydroxybenzoic acid (optionally hydrocarbyl substituted), the boron compound, and the amine component.

However, according to the invention, preferably the reaction product results from the reaction of a mixture of reactants (not including the solvent(s)) that consists essentially of at least one hydroxybenzoic acid (optionally hydrocarbyl substituted), at least one boron compound, and at least one amine component.

Even more preferably, the reaction product results from the reaction of a mixture of reactants (not including the solvent(s)) that consists of at least one hydroxybenzoic acid (optionally hydrocarbyl substituted), at least one boron compound, and at least one amine component.

Lubricant Composition

The invention is also directed to the use of the reaction products that have been above disclosed as additives in lubricating oil (or lubricant) compositions. It is also directed to the lubricant compositions comprising such additives.

Advantageously, the lubricant composition comprises:
from 60 to 99.9% of at least one base oil,
from 0.1 to 20% of at least one reaction product of at least a hydroxybenzoic acid (optionally hydrocarbyl substituted), a boron compound, and an amine component as above defined
the percentages being defined by weight of component as compared to the total weight of the composition.

Even more advantageously, the lubricant composition comprises:
from 60 to 99.9% of at least one base oil
from 0.1 to 15% of at least one reaction product of at least a hydroxybenzoic acid (optionally hydrocarbyl substituted), a boron compound, and an amine component as above defined,
the percentages being defined by weight of component as compared to the total weight of the composition.

Base Oils

Generally, the lubricating oil compositions according to the invention comprise as a first component an oil of lubricating viscosity, also called "base oils". The base oil for use herein can be any presently known or later-discovered oil of lubricating viscosity used in formulating lubricating oil compositions for any of the following applications, e.g., engine oils, marine cylinder oils, functional fluids such as hydraulic oils, gear oils, transmission fluids, like for example automatic transmission fluids, turbine lubricants, trunk piston engine oils, compressor lubricants, metal-working lubricants, and other lubricating oil and grease compositions.

Advantageously, the lubricant compositions according to the invention are marine engine lubricating oil compositions, preferably they are 2-stroke marine engine lubricating oil compositions.

Generally, the oils also called "base oils" used for formulating lubricant compositions according to the present invention may be oils of mineral, synthetic or plant origin as well as their mixtures. The mineral or synthetic oils generally used in the application belong to one of the classes defined in the API classification as summarized below:

| | Saturated substance content (weight percent) | Sulfur content (weight percent) | Viscosity Index |
|---|---|---|---|
| Group 1 Mineral oils | <90% | >0.03% | 80 ≤ VI < 120 |
| Group 2 Hydrocracked oils | ≥90% | ≤0.03% | 80 ≤ VI < 120 |
| Group 3 Hydroisomerized oils | ≥90% | ≤0.03% | ≥120 |
| Group 4 | | PAOs | |
| Group 5 | | Other bases not included in the base Groups 1 to 4 | |

These mineral oils of Group 1 may be obtained by distillation of selected naphthenic or paraffinic crude oils followed by purification of these distillates by methods such as solvent extraction, solvent or catalytic dewaxing, hydrotreating or hydrogenation.

The oils of Groups 2 and 3 are obtained by more severe purification methods, for example a combination of hydrotreating, hydrocracking, hydrogenation and catalytic dewaxing. Examples of synthetic bases of Groups 4 and 5 include poly-alpha olefins, polybutenes, polyisobutenes, alkylbenzenes.

These base oils may be used alone or as a mixture. A mineral oil may be combined with a synthetic oil.

The lubricant compositions of the invention have a viscosity grade of SAE-20, SAE-30, SAE-40, SAE-50 or SAE-60 according to the SAEJ300 classification.

Grade 20 oils have a kinematic viscosity at 100° C. of between 5.6 and 9.3 mm$^2$/s.

Grade 30 oils have a kinematic viscosity at 100° C. of between 9.3 and 12.5 mm$^2$/s.

Grade 40 oils have a kinematic viscosity at 100° C. of between 12.5 and 16.3 mm$^2$/s.

Grade 50 oils have a kinematic viscosity at 100° C. of between 16.3 and 21.9 mm$^2$/s.

Grade 60 oils have a kinematic viscosity at 100° C. of between 21.9 and 26.1 mm$^2$/s.

Preferably, the lubricant composition according to the first aspect and the second aspect is a cylinder lubricant.

The cylinder oils for two-stroke diesel marine engines have a viscosimetric grade SAE-40 to SAE-60, generally preferentially SAE-50 equivalent to a kinematic viscosity at 100° C. comprised between 16.3 and 21.9 mm$^2$/s. Typically, a conventional formulation of cylinder lubricant for two-stroke marine diesel engines is of grade SAE 40 to SAE 60, preferentially SAE 50 (according to the SAE J300 classification) and comprises at least 50% by weight of a lubricating base oil of mineral and/or synthetic origin, adapted to the use in a marine engine, for example of the API Group 1 class. Their viscosity index (VI) is comprised between 80 and 120; their sulfur content is greater than 0.03% and their saturated substance content is less than 90%.

The system oils for two-stroke diesel marine engines have a viscosimetric grade SAE-20 to SAE-40, generally preferentially SAE-30 equivalent to a kinematic viscosity at 100° C. comprised between 9.3 and 12.5 mm$^2$/s.

These viscosities may be obtained by mixing additives and base oils for example containing mineral bases of Group 1 such as Neutral Solvent (for example 150 NS, 500 NS or 600 NS) bases and brightstock. Any other combination of mineral, synthetic bases or bases of plant origin, having, as a mixture with the additives, a viscosity compatible with the chosen SAE grade, may be used.

The quantity of base oil in the lubricant composition of the invention is from 30% to 90% by weight relative to the total weight of the lubricant composition, preferably from 40% to 90%, more preferably from 50% to 90%.

In one embodiment of the invention, the lubricant composition has a Base Number (BN) determined according to the standard ASTM D-2896 of at most 50, preferably at most 40, advantageously at most 30 milligrams of potassium hydroxide per gram of the lubricating composition, in particular ranging from 10 to 40, preferably 15 to 40 milligrams of potassium hydroxide per gram of the lubricant composition.

In another embodiment of the invention, the lubricant composition has a BN determined according to the standard ASTM D-2896 of at least 50, preferably at least 60, more preferably at least 70, advantageously 70 to 100.

Additives:

It is optionally possible to substitute the above-described base oils in full or in part by one or more thickening additives whose role is to increase both the hot and cold viscosity of the composition, or by additives improving the viscosity index (VI).

The lubricant composition of the invention may comprise at least one optional additive, chosen in particular from among those frequently used by persons skilled in the art.

In one embodiment, the lubricant composition further comprises an optional additive chosen amongst a neutral detergent, an overbased detergent, an anti-wear additive, an oil soluble fatty amine, a polymer, a dispersing additive, an anti-foaming additive or a mixture thereof.

Detergents are typically anionic compounds containing a long lipophilic hydrocarbon chain and a hydrophilic head, wherein the associated cation is typically a metal cation of an alkali metal or alkaline earth metal. The detergents are preferably selected from alkali metal salts or alkaline earth metal (particularly preferably calcium, magnesium, sodium or barium) salts of carboxylic acids, sulphonates, salicylates, naphthenates, as well as the salts of phenates. These metal salts may contain the metal in an approximately stoichiometric amount relative to the anion group(s) of the detergent. In this case, one refers to non-overbased or "neutral" detergents, although they also contribute to a certain basicity. These "neutral" detergents typically have a BN measured according to ASTM D2896, of less than 150 mg KOH/g, or less than 100 mg KOH/g, or less than 80 mg KOH/g of detergent. This type of so-called neutral detergent may contribute in part to the BN of lubricating compositions. For example, neutral detergents are used such as carboxylates, sulphonates, salicylates, phenates, naphthenates of the alkali and alkaline earth metals, for example calcium, sodium, magnesium, barium. When the metal is in excess (amount greater than the stoichiometric amount relative to the anion groups(s) of the detergent), then these are so-called overbased detergents. Their BN is high, higher than 150 mg KOH/g of detergent, typically from 200 to 700 mg KOH/g of detergent, preferably from 250 to 450 mg KOH/g of detergent. The metal in excess providing the character of an overbased detergent is in the form of insoluble metal salts in oil, for example carbonate, hydroxide, oxalate, acetate, glutamate, preferably carbonate. In one overbased detergent, the metals of these insoluble salts may be the same as, or different from, those of the oil soluble detergents. They are preferably selected from calcium, magnesium, sodium or barium. The overbased detergents are thus in the form of micelles composed of insoluble metal salts that are maintained in suspension in the lubricating composition by the detergents in the form of soluble metal salts in the oil. These micelles may contain one or more types of insoluble metal salts, stabilised by one or more types of detergent. The overbased detergents comprising a single type of detergent-soluble metal salt are generally named according to the nature of the hydrophobic chain of the latter detergent. Thus, they will be called a phenate, salicylate, sulphonate, naphthenate type when the detergent is respectively a phenate, salicylate, sulphonate or naphthenate. The overbased detergents are called mixed type if the micelles comprise several types of detergents, which are different from one another by the nature of their hydrophobic chain. The overbased detergent and the neutral detergent may be selected from carboxylates, sulphonates, salicylates, naphthenates, phenates and mixed detergents combining at least two of these types of detergents. The overbased detergent and the neutral detergent include compounds based on metals selected from calcium, magnesium, sodium or barium, preferably calcium or magnesium. The overbased detergent may be overbased by metal insoluble salts selected from the group of carbonates of alkali and alkaline earth metals, preferably calcium carbonate. The lubricating composition may comprise at least one overbased detergent and at least a neutral detergent as defined above.

Polymers are typically polymers having a low molecular weight of from 2000 to 50 000 dalton (Mn). The polymers are selected amongst PIB (of from 2000 Dalton), polyacrylates or polymetacrylates (of from 30 000 Dalton), olefin copolymers, olefin and alpha-olefin copolymers, EPDM, polybutenes, poly alpha-olefin having a high molecular weight (viscosity 100° C.>150), hydrogenated or non-hydrogenated styrene-olefin copolymers.

Anti-wear additives protect the surfaces from friction by forming a protective film adsorbed on these surfaces. The most commonly used is zinc dithiophosphate or DTPZn. Also in this category, there are various phosphorus, sulphur, nitrogen, chlorine and boron compounds. There are a wide variety of anti-wear additives, but the most widely used category is that of the sulphur phospho additives such as metal alkylthiophosphates, especially zinc alkylthiophosphates, more specifically, zinc dialkyl dithiophosphates or DTPZn. The preferred compounds are those of the formula $Zn((SP(S)(OR_1)(OR_2))_2$, wherein $R_1$ and $R_2$ are alkyl groups, preferably having 1 to 18 carbon atoms. The DTPZn is typically present at levels of about 0.1 to 2% by weight relative to the total weight of the lubricating composition. The amine phosphates, polysulphides, including sulphurised olefins, are also widely used anti-wear additives. One also optionally finds nitrogen and sulphur type anti-wear and extreme pressure additives in lubricating compositions, such as, for example, metal dithiocarbamates, particularly molybdenum dithiocarbamate. Glycerol esters are also anti-wear additives. Mention may be made of mono-, di- and tri-oleates, monopalmitates and monomyristates. In one embodiment, the content of anti-wear additives ranges from 0.01 to 6%, preferably from 0.1 to 4% by weight relative to the total weight of the lubricating composition.

Dispersants are well known additives used in the formulation of lubricating compositions, in particular for application in the marine field. Their primary role is to maintain in suspension the particles that are initially present or appear in the lubricant during its use in the engine. They prevent their agglomeration by playing on steric hindrance. They may also have a synergistic effect on neutralisation. Dispersants used as lubricant additives typically contain a polar group, associated with a relatively long hydrocarbon chain, generally containing 50 to 400 carbon atoms. The polar group typically contains at least one nitrogen, oxygen, or phosphorus element. Compounds derived from succinic acid are particularly useful as dispersants in lubricating additives. Also used are, in particular, succinimides obtained by condensation of succinic anhydrides and amines, succinic esters obtained by condensation of succinic anhydrides and alcohols or polyols. These compounds can then be treated with various compounds including sulphur, oxygen, formaldehyde, carboxylic acids and boron-containing compounds or zinc in order to produce, for example, borated succinimides or zinc-blocked succinimides. Mannich bases, obtained by polycondensation of phenols substituted with alkyl groups, formaldehyde and primary or secondary amines, are also compounds that are used as dispersants in lubricants. In one embodiment of the invention, the dispersant content may be greater than or equal to 0.1%, preferably 0.5 to 2%, advantageously from 1 to 1.5% by weight relative to the total weight of the lubricating composition. It is possible to use a dispersant from the PIB succinimide family, e.g. boronated or zinc-blocked.

Other optional additives may be chosen from defoamers, for example, polar polymers such as polydimethylsiloxanes, polyacrylates. They may also be chosen from antioxidant and/or anti-rust additives, for example organometallic detergents or thiadiazoles. These additives are known to persons skilled in the art. These additives are generally present in a weight content of 0.1 to 5% based on the total weight of the lubricating composition.

In one embodiment, the lubricant composition according to the invention may further comprise an oil soluble fatty amine.

The fatty amine is of a general formula (VI):

(VI)

wherein, $R'_1$ represents a saturated or unsaturated, linear or branched, hydrocarbon group comprising at least 12 carbon atoms, and optionally at least one heteroatom chosen amongst nitrogen, sulfur or oxygen, $R'_2$, $R'_4$ and $R'_5$ represent independently a hydrogen atom or a saturated or unsaturated, linear or branched, hydrocarbon group comprising optionally at least one heteroatom chosen amongst nitrogen, sulfur or oxygen, $R'_3$ represents a saturated or unsaturated, linear or branched, hydrocarbon group comprising at least 1 carbon atom, and optionally at least one heteroatom chosen amongst nitrogen, sulfur or oxygen, preferably oxygen, n is an integer, n is superior or equal to 1, preferably comprised between 1 and 10, more preferably between 1 and 6, notably chosen amongst 1, 2 or 3.

Preferably, the fatty amine is of a general formula (VI), wherein:

$R'_1$ represents a saturated or unsaturated, linear or branched, hydrocarbon group comprising between 12 and 22 carbon atoms, preferably between 14 and 22 carbon atoms, and optionally at least one heteroatom chosen amongst nitrogen, sulfur or oxygen, and/or $R'_2$, $R'_4$ and $R'_5$ represent independently a hydrogen atom; a saturated or unsaturated, linear or branched, hydrocarbon group comprising between 12 and 22 carbon atoms, preferably between 14 and 22 carbon atoms, more preferably between 16 and 22 carbon atoms; a $(R'_6-O)_p-H$ group wherein $R'_6$ represents a saturated, linear or branched, hydrocarbon group comprising at least 2 carbon atoms, preferably between 2 and 6 carbon atoms, more preferably between 2 and 4 carbon atoms, and p is superior or equal to 1, preferably comprised between 1 and 6, more preferably comprised between 1 and 4; a $(R'_7-N)_p-H_2$ group wherein $R'_7$ represents a saturated, linear or branched, hydrocarbon group comprising at least 2 carbon atoms, preferably between 2 and 6 carbon atoms, more preferably between 2 and 4 carbon atoms, and p is superior or equal to 1, preferably comprised between 1 and 6, more preferably comprised between 1 and 4, and/or $R'_3$ represents a saturated or unsaturated, linear or branched, alkyl group comprising between 2 and 6 carbon atoms, preferably between 2 and 4 carbon atoms.

In one embodiment, the fatty amine of general formula (VI) represents of from 0.5 to 10%, preferably of from 0.5 to 8% by weight with respect to the total weight of the lubricant composition.

The optional additives such as defined above contained in the lubricant compositions of the present invention can be incorporated in the lubricant composition as separate additives, in particular through separate addition thereof in the base oils. However, they may also be integrated in a concentrate of additives for marine lubricant compositions.

Method for Producing a Marine Lubricant

The present disclosure provides a method for producing a marine lubricant as above disclosed comprising the step of mixing the base oil with the reaction product of at least a hydroxybenzoic acid (optionally hydrocarbyl substituted), a boron compound, and an amine component as above defined as above defined.

Use for Lubricating Engines

The application also relates to the use of a reaction product of at least a hydroxybenzoic acid (optionally hydrocarbyl substituted), a boron compound, and an amine component as above defined for lubricating engines, preferably marine engines. Specifically, the invention is directed to the use of a reaction product of at least a hydroxybenzoic acid (optionally hydrocarbyl substituted), a boron compound, and an amine component as above defined for lubricating two-stroke marine engines and four-stroke marine engines, more preferably two-stroke marine engine.

In particular, the reaction product of at least a hydroxybenzoic acid (optionally hydrocarbyl substituted), a boron compound, and an amine component as above defined is suitable for use in a lubricant composition, as cylinder oil or system oil, for lubricating 2-stroke engines and four-stroke marine engines, more preferably 2-stroke engines.

The application also relates to a method for lubricating a two-stroke marine engines and four-stroke marine engines, more preferably two-stroke marine engine said method comprising application to said marine engine of the marine lubricant as above disclosed. In particular, the lubricant is applied to the cylinder wall, typically by a pulse lubricating system or by spraying the lubricant onto the piston's rings pack through an injector for lubricating 2-stroke engines. It has been observed that applying to the cylinder wall the lubricant composition according to the invention provides increased protection against corrosion, improved engine cleanliness.

EXPERIMENTAL

I—Material and Methods:

salicylic acid was bought from Sigma Aldrich boric acid was bought from Sigma Aldrich diamine was bought from Akzo Nobel base oil 1: Mineral oils Group I or brightstock of density between 895 and 915 kg/m$^3$, base oil 2: Group I mineral oils, in particular called 600NS viscosity at 40° C. of 120 cSt measured according to ASTM D7279, detergent package comprising an anti-foaming agent $C_{18}H_{37}$ salicylic acid was prepared by the following protocol: Salicylic acid (50.0 g) was combined with 1-octadecene with a catalytic amount of methanesulfonic acid (0.3 equivalent) and heated to 130° C. over 8 hours.

II—Preparation of the Lubricant Composition C1:

A mixture of 13.8 g of salicylic acid and 3.1 g of boric acid was suspended in 50 mL of heptane/water/methanol (20/15/15) at ambient temperature and under stirring. Said mixture was heated to 70° C. To this mixture was added 31.4 g of a diamine of the following formula:

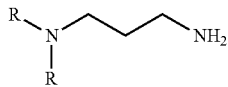

with R=linear $C_{18}H_{37}$
to provide a solution which was heated to 70° C. over 4 hours. Then, the solvent was removed under vacuum and the resulting product A1 was a homogeneous, light amber, viscous fluid.

The composition $C_1$ is disclosed in Table I. The percentages disclosed in Table I correspond to weight percent.

TABLE I

| Composition | $C_1$ (invention) |
|---|---|
| Base oil 1 | 29.8 |
| Base oil 2 | 55.0 |
| Detergent package | 9.0 |
| A1 | 6.2 |
| TBN (Total base number in mgKOH/g of composition) | 25 |

The invention claimed is:

1. A product resulting from the reaction of at least:
a hydroxybenzoic acid, optionally substituted by a hydrocarbyl group,
a boron compound,
an amine component selected from the group consisting of:
di- amines of formula (IV):
$R_1NX—Ra—NZ_1Z_2$ (IV)
tri-amines of formula (V):
$R_1NX—Ra\text{-}NY\text{-}Rb—NZ_1Z_2$ (V)
wherein
X represents a group selected from the group consisting of: a hydrogen, an alkyl group and an alkenyl group $R_2$,
Y represents a group selected from the group consisting of: a hydrogen, an alkyl group and an alkenyl group $R_4$,
$Z_1$ and $Z_2$ are independently selected from the group consisting of: a hydrogen,
an alkyl group and an alkenyl group $R_3$,
$R_1$, $R_2$, $R_3$ and $R_4$ are independently selected from the group consisting of alkyl and alkenyl groups having from 8 to 22 atoms of carbon,
Ra and Rb are independently selected from the group consisting of alkyl and alkenyl groups having from 1 to 20 atoms of carbon,
when $Z_1$ and $Z_2$ both represent an alkyl group or an alkenyl group $R_3$, they can be different.

2. The product according to claim 1, wherein the hydroxybenzoic acid, optionally substituted by a hydrocarbyl group, is selected from the group consisting of: mono-alk(en)yl substituted salicylic acids, di-alk(en)yl substituted salicylic acids, acid functionalized calixarenes, and mixtures thereof.

3. The product according to claim 1, wherein the hydroxybenzoic acid compound, optionally substituted by a hydrocarbyl group, corresponds to formula (I):

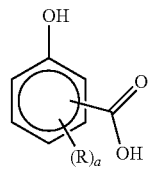

Wherein:
R represents a hydrocarbyl with 1 to 50 carbon atoms, and R can have one or more heteroatoms,
a is an integer, a represents 0, 1 or 2.

4. The product according to claim 3, wherein R has from 12 to 40 carbon atoms.

5. The product according to claim 3, wherein the hydroxybenzoic acid compound, optionally substituted by a hydrocarbyl group, corresponds to formula (IA):

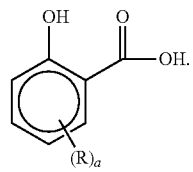

6. The product according to claim 5, wherein the hydroxybenzoic acid compound is salicylic acid.

7. The product according to claim 1, wherein the boron compound is selected from the group consisting of: boric acid, boric acid complexes, boric oxide, a trialkyl borate in which the alkyl groups comprise independently from 1 to 4 carbon atoms, a $C_1$-$C_{12}$ alkyl boronic acid, a $C_1$-$C_{12}$ dialkyl boric acid, a $C_6$-$C_{12}$ aryl boric acid, a $C_6$-$C_{12}$ diaryl boric acid, a $C_7$-$C_{12}$ aralkyl boric acid, a $C_7$-$C_{12}$ diaralkyl boric acid, and products deriving from these by substitution of an alkyl group by one or more alkoxy unit.

8. The product according to claim 7, wherein the boron compound is boric acid.

9. The product according to claim 1, wherein the amine component is selected from compounds corresponding to formula (IVA):

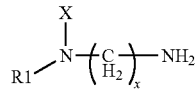

with x=2, 3, 4.

10. The product according to claim 1, wherein the amine component is selected from compounds corresponding to formula (VB):

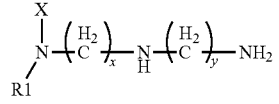

With:
x=2, 3, 4,
y=2, 3, 4.

11. The product according to claim 1, wherein $R_1$, $R_2$, $R_3$ and $R_4$ are, independently, selected from the group consisting of linear alkyl groups and alkenyl groups with 14 to 22 carbon atoms.

12. The product according to claim 11, wherein $R_1$, $R_2$, $R_3$ and $R_4$ are, independently, selected from the group consisting of linear alkyl groups and alkenyl groups with 14 to 18 carbon atoms.

13. The product according to claim 12, wherein $R_1$, $R_2$, $R_3$ and $R_4$ are, independently, selected from the group consisting of linear alkyl groups and alkenyl groups with 16 to 18 carbon atoms.

14. The product according to claim 11, wherein $R_1$, $R_2$, $R_3$ and $R_4$ are derived from animal and vegetal oils and fats.

15. The product according to claim 14, wherein $R_1$, $R_2$, $R_3$ and $R_4$ are derived from tallow oil.

16. The product according to claim 1, wherein Ra and Rb are independently selected from linear alkyl groups having from 2 to 4 carbon atoms.

17. The product according to claim 16, wherein Ra and Rb are selected from the group consisting of: $-CH_2-CH_2-$, and $-CH_2-CH_2-CH_2-$.

18. A lubricant composition comprising a product according to claim 1 and a base oil.

19. A lubricant composition according to claim 18 comprising:

from 60 to 99.9% of at least one base oil, from 0.1 to 20% of at least one product the percentage being defined by weight of component as compared to the total weight of the composition.

20. Method for lubricating two-stroke marine engines and four-stroke marine engines comprising application to said marine engines of a product according claim 1 or a lubricant composition comprising the product and a base oil.

* * * * *